(12) United States Patent
Yoon et al.

(10) Patent No.: US 6,693,055 B2
(45) Date of Patent: Feb. 17, 2004

(54) ZEOLITE-SUBSTRATE COMPOSITE COMPRISING A PATTERNED ZEOLITE LAYER ON A SUBSTRATE AND PREPARATION THEREOF

(75) Inventors: Kyung-Byung Yoon, Seoul (KR); Goo-Soo Lee, Seoul (KR); Kwang Ha, Seoul (KR); Yun-Jo Lee, Seoul (KR); Yu-Sung Chun, Kyunggi-do (KR); Yong-Soo Park, Seoul (KR)

(73) Assignee: Sogang University Corporation, Seoul (KR)

( * ) Notice: Subject to any disclaimer, the term of this patent is extended or adjusted under 35 U.S.C. 154(b) by 0 days.

(21) Appl. No.: 10/169,187

(22) PCT Filed: Nov. 1, 2001

(86) PCT No.: PCT/KR01/01854

§ 371 (c)(1),
(2), (4) Date: Jun. 28, 2002

(87) PCT Pub. No.: WO02/36340

PCT Pub. Date: May 10, 2002

(65) Prior Publication Data

US 2003/0017936 A1 Jan. 23, 2003

(30) Foreign Application Priority Data

Nov. 1, 2000 (KR) .................................. 10-2000-64534

(51) Int. Cl.[7] ............................ B01J 35/00; B01J 29/06
(52) U.S. Cl. ................................ 502/4; 502/60; 502/64
(58) Field of Search ................................ 502/4, 60, 64

(56) References Cited

U.S. PATENT DOCUMENTS 6,120,891 A  9/2000  Balkus, Jr. et al.
6,177,373 B1  1/2001  Sterte et al.
2002/0060364 A1 * 5/2002  Yan et al. .................... 257/758

OTHER PUBLICATIONS

Huang et al., "Fabrication of Ordered Porous Structures by Self–Assembly of Zeolite Nanocrystals," J. Am. Chem. Soc., 2000, v 122, pp. 3530–3531.*

Li, et al.; "Self–Assembling Trimolecular Redox Chains at Zeolite Y Modified Electrodes"; Inorg. Chem 1989, 28, 178–182.

Boudreau et al; "Deposition of Oriented Zeolite A Films: In Situ and Secondary Growth"; Journal of Membrane Science, 152, 1999, 41–59.

Bein, T.; "Synthesis and Applications of Molecular Sieve Layers and Membranes"; Chem. Mater, 1996, 8, 1636–1653.

* cited by examiner

*Primary Examiner*—Tom Dunn
*Assistant Examiner*—Christina Ildebrando
(74) *Attorney, Agent, or Firm*—Nixon & Vanderhye, P.C.

(57) ABSTRACT

The present invention relates to a method for the preparation of a zeolite-substrate composite comprising a patterned zeolite monolayer or multilayer on a substrate, which comprises forming a pattern of a linking compound on the substrate by a selective irradiation with a UV ray, a selective application of a linking compound or a blocking compound, or a selective deposition of a metal, and combining zeolite particles on the portion whereon the linking compound is patterned. The substrate is selected from a group consisting of a substrate having surface hydroxyl groups, a metal capable of being reacted with thiol or amino groups, and a polymeric material having various surface functional groups. The present invention also relates to a zeolite-substrate composite comprising a patterned zeolite monolayer or multilayer on a substrate prepared by said method.

18 Claims, 8 Drawing Sheets

US 6,693,055 B2

ZEOLITE-SUBSTRATE COMPOSITE COMPRISING A PATTERNED ZEOLITE LAYER ON A SUBSTRATE AND PREPARATION THEREOF

This application is the US national phase of international application PCT/KR01/01854 filed Nov. 1, 2001, which designated the U.S.

TECHNICAL FIELD

The present invention relates to a zeolite-substrate composite comprising a patterned zeolite layer and a method of preparation of the same. More specifically, the present invention relates to a method for the preparation of a zeolite-substrate composite comprising a patterned zeolite monolayer or multilayer on a substrate, which comprises forming a pattern of a linking compound on the substrate by binding a linking compound on the substrate surface followed by a selective irradiation with UV ray thereon, or by a selective coating on a portion of the substrate surface with a linking compound or a blocking compound such as octadecyltrichlorosilane, or by a selective deposition of a metal such as platinum on the substrate surface followed by binding a linking compound thereon, and combining selectively zeolite or zeotype molecular sieve (hereinafter, referred as to "zeolite" or "molecular sieve") along with said pattern, wherein said substrate is selected from a group consisting of a substance having surface hydroxyl groups, a metal capable of being reacted with thiol group (—SH) or amino group (—NH$_2$) and a polymeric material having various surface functional groups. The present invention also relates to the zeolite-substrate composite prepared thereby.

BACKGROUND ART

Molecular sieves including zeolite are important materials, which have been employed widely in the household item level and the industrial field. Zeolite generally presents in the form of fine powder, which gives both advantages and disadvantages for using zeolite. Combining those zeolite particles firmly with various substrates through chemical bond, a wide industrial applicability of zeolite can be expected.

Further, it can be said that it is significant to adjust the zeolite so as to have a uniform orientation to the substrate as it can induce new physical properties expectedly. Still further, if zeolite particles are combined to the substrate surface so as to have a selective and/or uniform orientation, novel characteristics that have never been found in the conventional material would be expected and an epoch-making development may be achieved.

"Zeolite" is a generic name of crystalline aluminosilicate, which constitutes the pore skeleton of zeolite molecules and bears an anionic charge for each aluminum atom. Cations for offsetting such anion charges are present within the pore space and the remaining pore space is filled with water. The three dimensional pore structure of the zeolite molecule varies depending on the shape and size of the pore, and the pore diameter is usually determined by size of the molecule. Therefore, based on the shape and size of the pore, zeolite has a shape selectivity for a molecule entering into the pore. In this connection, zeolite is called as a molecular sieve.

Zeolite (or molecular sieve) or analogous molecular sieves (hereinafter, referred to as zeolite or its analogs) show diverse chemical and physical properties depending on its chemical composition, structure, pre-treatment method, etc. Especially, modified zeolite in which protons are replaced with other cations is widely used as a cracking catalyst of crude oil in the petrochemical industry, thanks to its resistance to high temperature. Further, zeolite is widely used as a water-absorbing drying agent, adsorbent, gas-purifying agent, ion exchanger, additives for detergent, soil improving agent or the like. An extensive study is now being made on its application as a sensor carrier.

Meanwhile, there are known many other zeolite-like molecular sieves (or zeotype molecular sieves) wherein a part or all of silicon (Si) and/or aluminum (Al) atoms constituting the structural skeleton of zeolite molecule are replaced with other elements. For example, a mesoporous silica (MCM-series mesoporous silica and silicalite, etc.) in which aluminum atoms are completely eliminated, an alpo (AlPO$_4$)-type molecular sieve in which silicon atoms are replaced with phosporous atoms, and other molecular sieve or its analog wherein skeleton metal atoms are partly replaced with various metal atom such as Ti, Mn, Co, Fe, Zn, etc., have been developed and widely used.

For better utilization of zeolite or its analogs, studies have been carried out to develop methods of attaching zeolite particles to the surface of substrates such as glass, ceramics, polymeric materials, metal, etc. [L. C. Boudreau, J. A. Kuck, M. Tsapatsis, *J Membr. Sci.* 1999, 152, 41–59; Z. Li, C. Lai, T. E. Mallouk, *Inorg. Chem.* 1989, 28, 178–182; L. C. Boudreau, J. A. Kuck, M. Tsapatsis, *J. Membr. Sci.* 1999, 152, 41–59; J. C. Jansen, D. Kashchiev, A. Erdem-Senataler, *Stud. Surf, Sci. Catal,* 1994, 85. 215–250; R. Althoff, K. Unger, F. Shuff, *Microporous Mater,* 1994, 2, 557–562].

However it is not easy to perfectly control the thickness and orientation of a zeolite monolayer through conventional methods. The inventors have developed a simple and economic method for the preparation of a composite of substrate-linking compound-zeolite by chemically changing the surface of the substrate or zeolite by using a linking compound having functional groups capable of reacting with the substrate or zeolite, respectively. [See: PCT/KR00/01001 with claiming a priority based on Korean Patent Application No. 2000–19667 (filed on Apr. 14, 2000)].

On the other hand, numerous studies have been carried out in respect of the formation of the pattern on the surface of substrates such as glass, ceramics, polymeric materials and metal. As to conventionally known methods for forming a pattern, the following three methods can be exemplified basically.

The first method is a selective irradiation wherein UV ray is irradiated with a photomask to selectively form a pattern. The second method is a stamping method wherein a pattern is previously prepared onto a cast by using polydimethylsiloxane (PDMS), a linking compound or a blocking compound such as octadecyltrichlorosilane is applied onto the cast, and said cast is stamped onto the substrate to form said pattern on the substrate. The third method is a selective metal deposition wherein a metal grid is stuck to a substrate and a deposited layer of a metal such as platinum is selectively formed on the substrate to form a pattern.

As set forth herein above, such technology wherein a surface is modified by forming a pattern on a substrate so that the chemical reactivity of the surface of the substrate varies along the pattern formed on said substrate is well known. There are many technical difficulties in modifying the surface of zeolite so as to have a chemical reactivity to combine the zeolite particles chemically onto a substrate.

The inventors have already achieved a great development of the chemical procedure by modifying a chemical reaction that happens in a solution state so that it can happen at the surface of a material. Further, the inventors have extensively studied in order to produce various composites by utilizing the methods thus developed.

As a result, the inventors have developed a method for the formation of a patterned monolayer or multilayer of zeolite having an excellent durability and orientation, which comprises forming a pattern on the substrate by means of UV ray, a blocking compound, a metal (e.g., platinum) deposition, etc. and chemically combining of zeolite onto the patterned surface of the substrate.

As set forth hereinabove, it has been well known to modify the surface so as to the different chemical reactivity along the pattern by forming a pattern thereon by means of UV ray, a linking or blocking compound (e.g., octadecyltrichlorosilane), a metal (e.g., platinum) deposition, etc. However, it has never been reported to form a patterned zeolite layer on surface-modified substrate.

It is now found that, when the method described in said Korean Patent Application No.2000-19667 filed by the inventors, i.e., when the method of combining zeolite to a substrate via a chemical bonding is employed, it is possible to laminate on a substrate on which a pattern has been formed a zeolite layer along the pattern formed on the substrate, to laminate not only a monolayer but also a multilayer, and to easily and diversely control the shape and material (zeolite type) in each layer.

DETAILED DESCRIPTION OF THE INVENTION

The present invention relates to a method for the preparation of a zeolite-substrate composite, namely a composite of substrate-linking compound-zeolite comprising a patterned zeolite monolayer or multilayer, which comprises forming a pattern of a linking compound on the substrate by binding a linking compound on the substrate surface followed by a selective irradiation with UV ray thereon, or by a selective coating on a portion of the substrate surface with a linking compound or a blocking compound such as octadecyltrichlorosilane, or by a selective deposition of a metal such as platinum on the substrate surface followed by binding a linking compound thereon, and combining selectively zeolite along with said pattern, wherein said substrate is selected from a group consisting of a substance having surface hydroxyl groups, a metal capable of being reacted with thiol group (—SH) or amino group (—NH$_2$) and a polymeric material having various surface functional groups.

Accordingly, the first object of the present invention is to provide a method for the preparation of a zeolite-substrate composite, namely a composite of substrate-linking compound-zeolite comprising a patterned zeolite monolayer or multilayer, characterized in that it comprises (i) combining a linking compound onto the surface of substrate, (ii) modifying the linking compound combined to the substrate or the functional group thereof by irradiating UV ray through a photomask having a pattern, (iii) selectively forming a zeolite layer on the area to which UV ray is irradiated or the area to which UV ray is not irradiate, and (iv) optionally performing a calcination.

In the above method of the first object, after removing the portion to which UV ray is irradiated of the portion to which UV ray is not irradiated, a zeolite layer may be formed.

The second object of the present invention is to provide a method for the preparation of a zeolite-substrate composite, namely a composite of substrate-linking compound-zeolite comprising a patterned zeolite monolayer or multilayer, characterized in that it comprises (i) combining a linking compound to a part of the surface of the substrate so as to have a predetermined pattern and then combining a blocking compound to the remaining surface of the substrate, or combining a blocking compound to a part of the surface of the substrate so as to have a predetermined pattern and then combining a linking compound to the remaining surface of the substrate, (ii) forming a zeolite layer on the area to which the linking compound is combined, and (iii) optionally performing a calcination.

In the above method of the second object, the linking compound or blocking compound can be coated on a part of the substrate surface by the stamping method.

The third object of the present invention is to provide a method for the preparation of a zeolite-substrate composite, namely a composite of substrate-linking compound-zeolite comprising a patterned zeolite monolayer or multilayer, characterized in that it comprises (i) depositing a metal such as platinum onto a part of the substrate surface to form a metal layer so as to have a predetermined pattern. (ii) forming a zeolite layer by growing crystal or combining zeolite-linking compound on the remaining area, and (iii) optionally performing a calcination.

The fourth object of the present invention is to provide a patterned monolayer or multilayer of zeolite prepared by said method, wherein the type and kind of zeolite as well as the pattern style in each of the layer can be identical with or different from each other respectively.

In the present invention, it is possible to repeat each of the first, second and third methods or combination thereof in order to produce a composite of patterned zeolite multilayer.

The present invention will be illustrated in detail below.

In the present invention, the term of "zeolite" or "molecular sieve" has a meaning including zeolite or molecular sieve as well as their analogs and used indiscriminately unless otherwise specified.

1. Type of the Substrate

Examples of the substrate that can be employed in the present invention are as follows:

1) materials containing hydroxyl groups on the surface, selected from a group consisting of oxides or mixed oxides of metals and non-metals such as silicon, aluminum, titanium, tin, indium, etc., which can be used alone or in a mixture, for example, quartz, mica, glass, ITO glass (glass deposited with indium oxide of tin), tin oxide (SnO$_2$), and other conductive glass, silica, porous silica, alumina, porous alumina, titanium dioxide, porous titanium dioxide, silicon wafer and the likes, 2) metals capable of reacting with a thiol or amino group, such as gold, platinum, silver, copper, and the like;

3) polymers having various functional groups on their surfaces, such as PVC, a Merrifield peptide resin and the like;

4) semiconductive materials, such as selenium-zinc (ZnSe), gallium-arsenic (GaAs) and indium-phosphor (InP), and the like;

5) Natural materials of high molecular weight, which carry hydroxyl groups on their surfaces, such as cellulose, starch (e.g., amylose and amylopectin), lignin and the like; or 6) Natural or synthetic zeolite or molecular sieve analogs, as defined in below.

2. Type of Molecular Sieve

The molecular sieve, i.e., zeolite and its analogous molecular sieve that can be employed in the present invention are as follows:

1) Natural and synthetic zeolite,
2) Modified molecular sieve wherein all or a part of the silicon atoms in the zeolite skeleton are replaced with other atoms such as phosphorous (P) or the like (e.g., $AlPO_4$, SAPO, MeAPO, MeAPSO type molecular sieve),
3) Modified molecular sieve wherein all or a part of the silicon atoms in the zeolite skeleton are replaced with other atoms such as boron (B), gallium (Ga). Titanium (Ti), etc.,
4) Molecular sieves by the combination of the above modifications of the above modifications of item 2 and 3,
5) Porous metals or silicon oxides (e.g., silicalite, MCM type porous silica, porous titanium dioxide, niobium dioxide, etc.) or mixed oxide thereof, or
6) Porous molecular sieves prepared with any other elements alone or in a mixture.

3. Type of Linking Compound

The linking compound in the present invention means the compound having functional groups capable of chemically reacting with substrates or zeolite at each of the both terminals. The functional groups capable of chemically reacting with the substrate or zeolite means a group capable of chemically binding to hydroxyl group such as, for example, trichlorosilyl group (—$SiCl_3$), trimethoxysilyl group (—$Si(CH_3)_3$) or iscyanato group (—N=C=O) with respect to the substrate such as zeolite or glass having surface hydroxyl groups, and thiol with respect to substrates such as gold. Those compounds carrying such functional groups have been known to be capable of forming a self-assembled monolayer (SAM) when reacted with said substrate.

It is understood that a functional group capable of chemically reacting with a substrate can be determined depending on the nature (namely, the functionality) of the substrate's surface and can be suitably selected by a person having ordinary skill in the art.

The linking compounds that can be employed in the present invention can be preferably selected from the following compounds of formula 1 to 7 or a combination thereof:

| | |
|---|---|
| $R_3Si$-L-X | (1) |
| $MR'_4$ | (2) |
| Y-L-Y | (3) |
| $R_3Si$-L-Y | (4) |
| HS-L-X | (5) |
| HS-L-$SiR_3$ | (6) |
| HS-L-Y | (7) |

Wherein, R represents a halogen atom, $C_1$–$C_4$ alkoxy or alkyl group; L represents a hydrocarbon residue, e.g., substituted or unsubstituted $C_1$–$C_{17}$ alkyl, aralkyl or aryl group, which may have at least one heteroatom such as oxygen, nitrogen and sulfur; X represents a leaving group such as a halogen atom; provided that at least one of the three Rs in a $SiR_3$ group denote a halogen or alkoxy group; R' is the same as R and the two of four R's in $MR'_4$ denote a halogen or alkoxy group; M represents Si or a transition metal such as Ti or Zr; Y represents a ligand having a functional group selected from a group consisting of hydroxyl, thiol, amine, ammonium, sulfone and its salt, carboxyl acid and its salt, acid anhydride, epoxy, aldehyde, ester, acrylate, isocyanate (—NCO), sugar residue, double bond, triple bond, diene, diyne, alkylphosphine, alkylamine as well as a reactive functional group of various coordination compounds capable of exchanging their ligands; provided that said functional group can exist in the middle or at the terminal ends of the ligands.

The linking compound combined to the substrate or zeolite can have at least one functional group in the skeleton of the linking compound to give the secondary chemical bonding. To illustrate, when a linking compound combined to the substrate contains formyl group (—CHO) in the molecule and another linking compound combined to the surface of zeolite has amino group (—$NH_2$) in the molecule, zeolite can combine to the substrate via a chemical linkage of linking compound-linking compound since a chemical reaction between the amino group and the formyl group can easily happen.

As illustrated above, another linking compound or a bifunctional compound can intermediate in the linkage of linking compound-linking compound, for instance the following interposition compound can be exemplified: at least a compound selected from a group consisting of fullerene ($C_{60}$, $C_{70}$), carbon nanotubes, α,ω-dialdehyde, dicarboxylic acid, dicarboxyl acid anhydride, amine-dendrimer, polyethylene imine, α,ω-diamine, a complex of [M(salan)] (wherein M represents Co, Ni, Cr, Mn, Fe and the like, and salan represents N,N-bis(salicylidene)ethylenediamine), and metal porphyrin derivatives.

Considering collectively the above matters, a linking compound should have at least two functional group, one for combining with the substrate and another one for chemically combining with the functional group of the other linking compound bound to the surface of the other zeolite or particles thereof. The matching or combination of the linking compound and its functional group can greatly vary and is easily achieved by a person having ordinary skill in the pertinent art depending on the necessity. Those variations and modifications are also included in the scope of the present invention if they employ the concept of the present invention.

4. Chemical Reaction of Linking Compounds with a Substrate or Zeolite

Since substrates such as glass and molecular sieves such as zeolite have hydroxyl groups on their surface as described above, they can react with linking compounds having a suitable functional group capable of reacting with hydroxyl group to form a composite of substrate-linking compound or linking compound-zeolite. Further, since some functional group can be modified or changed to a new functional group by a suitable treatment, a material having any adequate functionality on its surface can be modified through a chemical treatment so as to have new functionality. The reaction and its condition for said treatment have been publicly known in this field.

Although metals such as gold does not have hydroxyl group on the surface, it exhibit a superior reactivity to thiol group and so can be used as a substrate in the present invention owing to the remarkable reactivity to the linking compound introduced with one terminal thiol group. The compound having a one terminal thiol group can be used as a linking compound or blocking compound to the substrate of gold.

The substrate or zeolite particles are put into a container containing an organic solvent such as toluene, to which a linking compound is added and then the mixture is heated. Instead of toluene, another organic solvent such as hexane, benzene, tetrachlorocarbon, alcohol, etc. can be adequately used for the reaction. Upon the completion of reaction, the substrate is taken out and then washed with toluene. When executing such a chemical bonding onto the surface of zeolite, the vapor of the organic compound can be used sometimes to raise the chemical bonding directly. The zeolite in the dispersed liquid is filtered through filter paper. and washed well with the organic solvent. When the zeolite particle is too small to use filter paper, a centrifuge is employed to separate the particles. The zeolite crystals are introduced into a reaction container containing toluene and then dispersed well by an ultrasonic washer. Said compounds also can be evaporated without solvent under reduced pressure to vacuum so as to combine with the substrate or zeolite.

5. Method for Forming a Pattern on the Surface of Substrate

Although there are many methods for the formation of a pattern on the substrate surface, the present invention employs the following three methods. "Formation of a pattern" in the present invention means that the surface is blocked so that zeolite will react or will not react with the surface in a selective manner. The present method is not restricted on to the three methods, and any modifications or method that can give the same effects with those methods fall within the scope of the present invention.

First, there is a method wherein a UV ray is employed to modify linking compounds.

On a substrate to which linking compounds are combined, a pattern-formed photomask is put and then UV ray (254 nm) is irradiated for a suitable time. In the region to which a UV ray has been irradiated, said terminal functionality of the linking compounds that are combined onto the substrate will be modified. In the region to which a UV ray has not been irradiated, the terminal functionality of the linking compounds that are combined onto the substrate will still remain. Accordingly, a difference in the chemical functionality arises on the surface of substrate along the shape of the pattern. The change of the functionality by the irradiation of UV ray can be performed conversely.

Second, there is a method wherein blocking compounds or linking compounds are directly applied on the substrate in a microcontacting manner.

In the present invention, the blocking compound means a compound that has only one functional group which will react with the substrate, and as a result, does not have any functional group which will react with zeolite or the other linking compound at the opposite end. For example, it includes trialkoxyalkylsilane ($RSi(OR)_3$, R=alkyl) or trichloroalkylsilane ($RSiCl_3$, R=alkyl). In said blocking compound, alkyl group preferably has at least six carbon atoms, more preferably at least ten carbon atoms.

On a PDMA (polydimethylsiloxane) stamp on which a pattern has been formed, a solution of octadecyltrichlorosilane (OTS) in hexane is applied, and then said stamp is mounted on a spin coater. The PDMS stamp was rotated to uniformly distribute octadecyltrichlorosilane thereon and then impressed on a glass plate. The glass plate was left at room temperature for more than one hour and then dried at 120° C. for five minutes. Octadecyltrichlorosilane reacts with silanol group of the glass to form an octadecyl monolayer along the shape of the pattern. Namely, an octadecyl monolayer is formed in the region of the glass surface with which the stamp had contacted, while silanol remains unreacted in the region of the glass surface with which the stamp has not contacted. When the surface of the glass plate on which octadecyl groups are combined in a pattern is treated with a linking compound as described above, the area wherein octadecyl groups are already combined will still remain as it is, while the linking compound is combined only to the region in which hydroxyl group (—OH) exists to give new functionality. Accordingly, the chemical functionality will be differentiated along the shape of the pattern.

Third, there is a method wherein a non-reactive metal is deposited on a part of the surface to block the metal-deposited surface. In general, any metal that can be applied in conventional chemical deposition may be employed in the present invention. The present invention exemplifies a deposition of platinum, to which the scope of the invention is not restricted.

By using the procedure that is similar to the method using a UV ray, a pattern-formed mask is put on the substrate and then platinum is deposited in a thickness of about 15 nm by means of a vacuum thermal depositing machine. The area contacted with the mask preserves the functionality of substrate without depositing platinum, while the exposed area is deposited with platinum to have the functionality of platinum. In this way, a pattern can be formed so that on the surface of substrate has diverse chemical functionality different from each other.

The method for forming a pattern on the surface of substrate with a linking compound or blocking compound is not restricted to the above methods only.

6. Method for Forming a Patterned Monolayer or Multilayer of Zeolite on the Surface of Substrate When zeolite particles are chemically combined with a pattern-formed substrate having a difference in its chemical functionality along the pattern, zeolite will combine along the pattern due to its functionality.

Meanwhile, zeolite particles may be physically attached on the patterned zeolite monolayer of a composite during the preparation thereof. These zeolite particles physically attached thereon can be easily removed by ultra-sonic washing.

A composite having a patterned zeolite multilayer can be produced easily by repeating said methods as described above. Specifically, a patterned zeolite bilayer (double layer) will be formed by repeatedly treating zeolite particles having a functional group capable of chemically reacting with the functional group of the linking compound which has already combined onto a patterned zeolite monolayer, and a patterned zeolite multiplayer will be formed by repeating the above procedure for the bilayer.

In a multilayer composite, the types of zeolite consisting of the upper and lower layers are the same as or different from each other, and the patterns of the upper and lower layers are the same as or different from the other.

DESCRIPTION OF PREFERRED EMBODIMENTS

Figure 1:
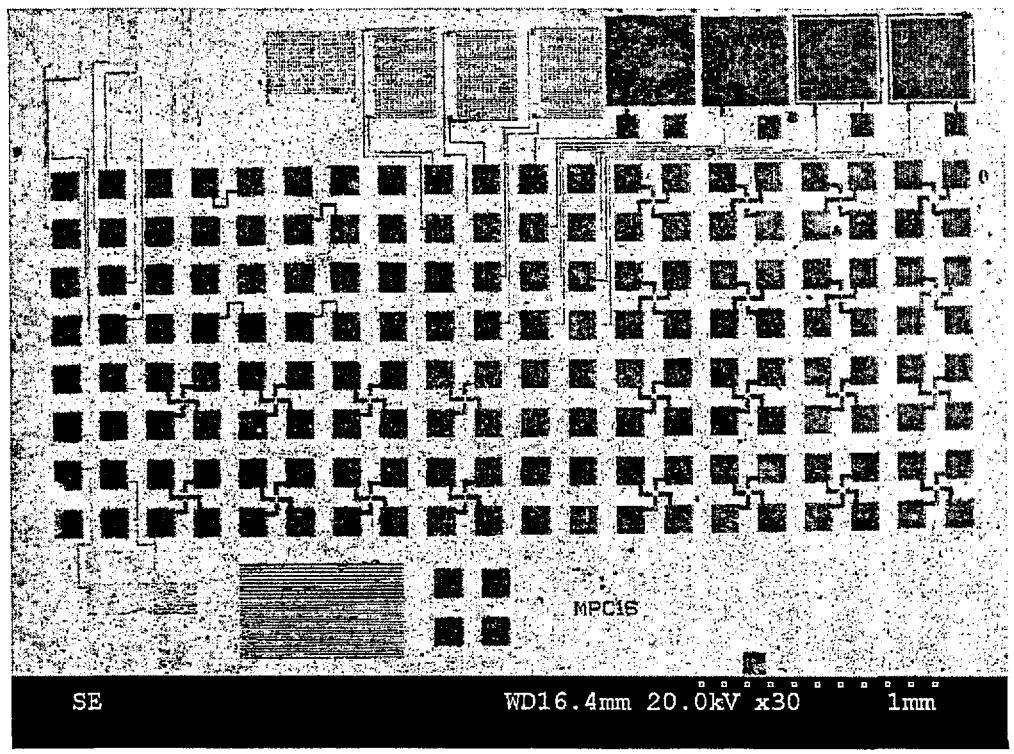
FIGS. 1 and 2 are SEM (scanning electron microscope) photographs of a patterned zeolite ZSM-5 monolayer on a glass plate (magnification: ×30), which were prepared by the method in Example 8 (using a blocking compound).
Figure 2:
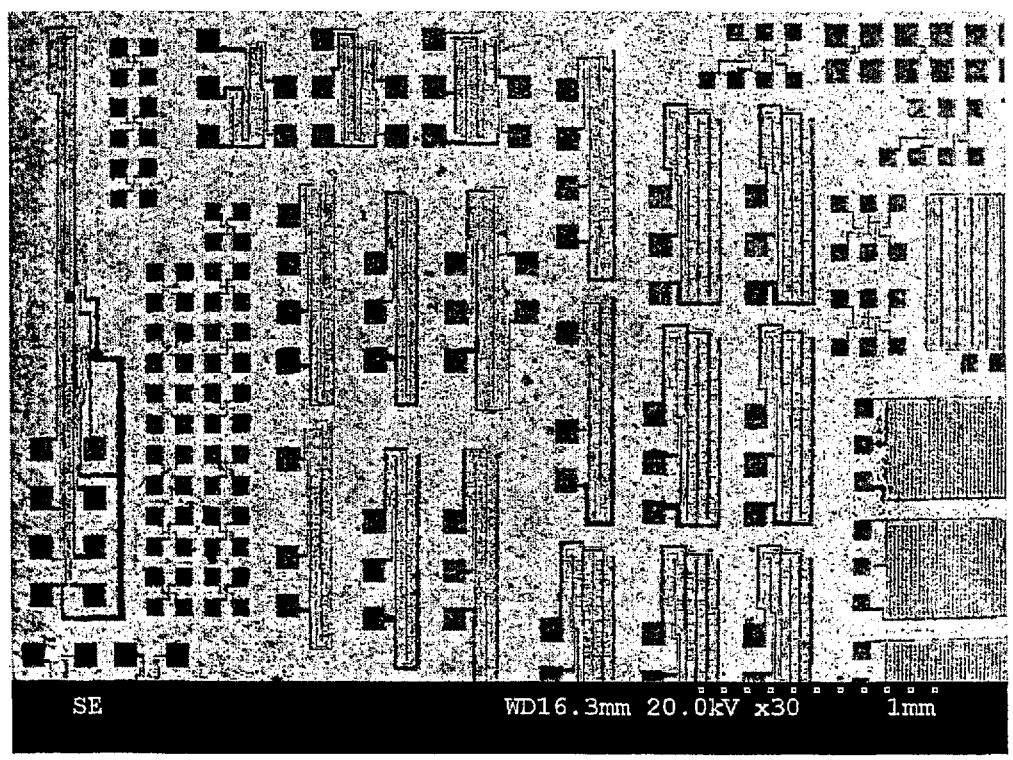
Figure 3:
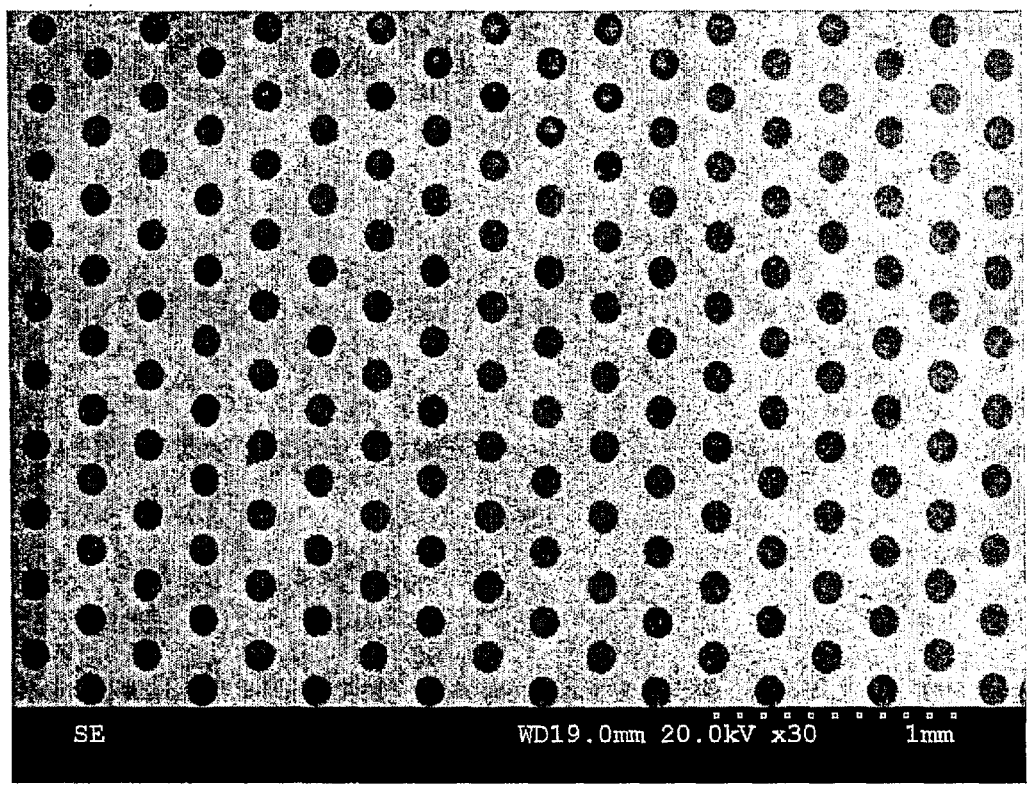
FIGS. 3 and 4 are SEM (scanning electron microscope) photographs of a patterned zeolite ZSM-5 monolayer on a glass plate (magnification: ×30 and ×100, respectively), which were prepared by the method in Example 4 (using a UV ray irradiation).
Figure 4:
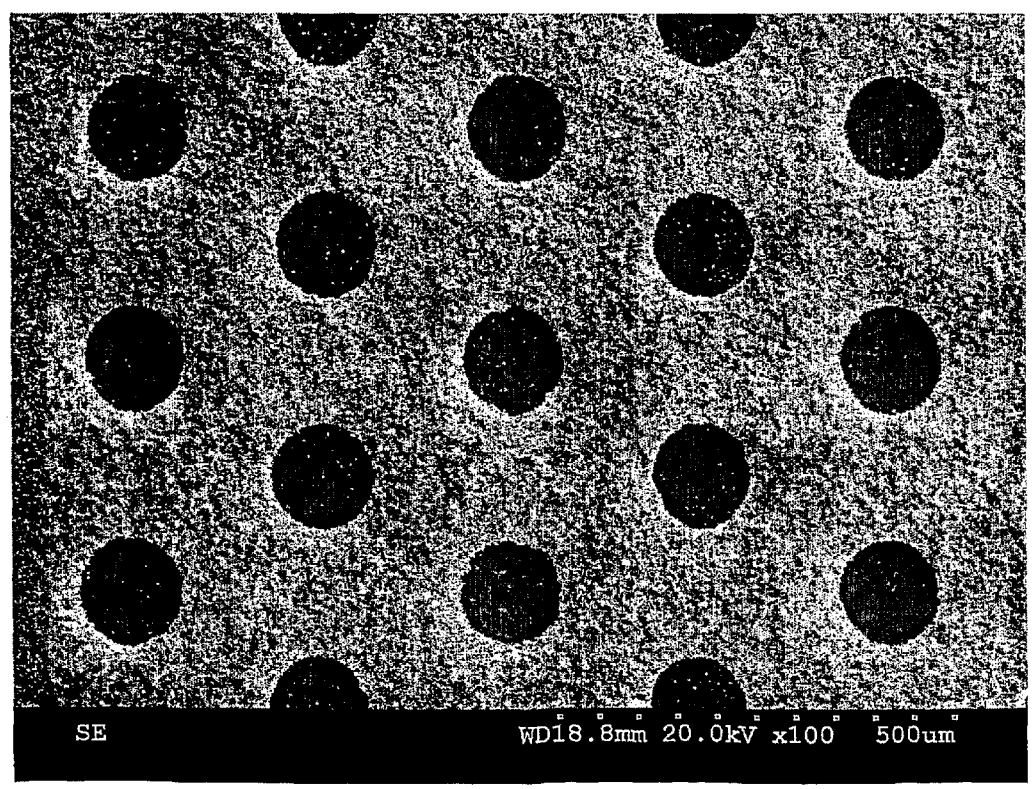
Figure 5:
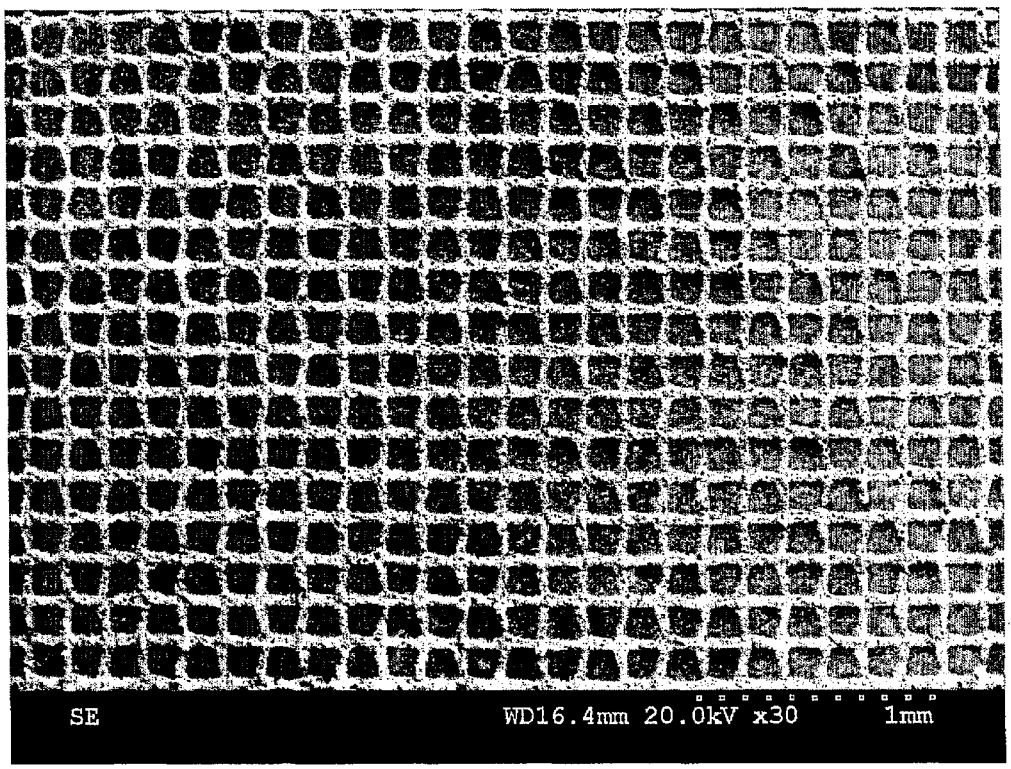
FIGS. 5 is a SEM (scanning electron microscope) photograph of a patterned zeolite ZSM-5 monolayer on a gold plate (magnification: ×100), which was prepared by the method in Example 6 (using a UV ray irradiation).
Figure 6:
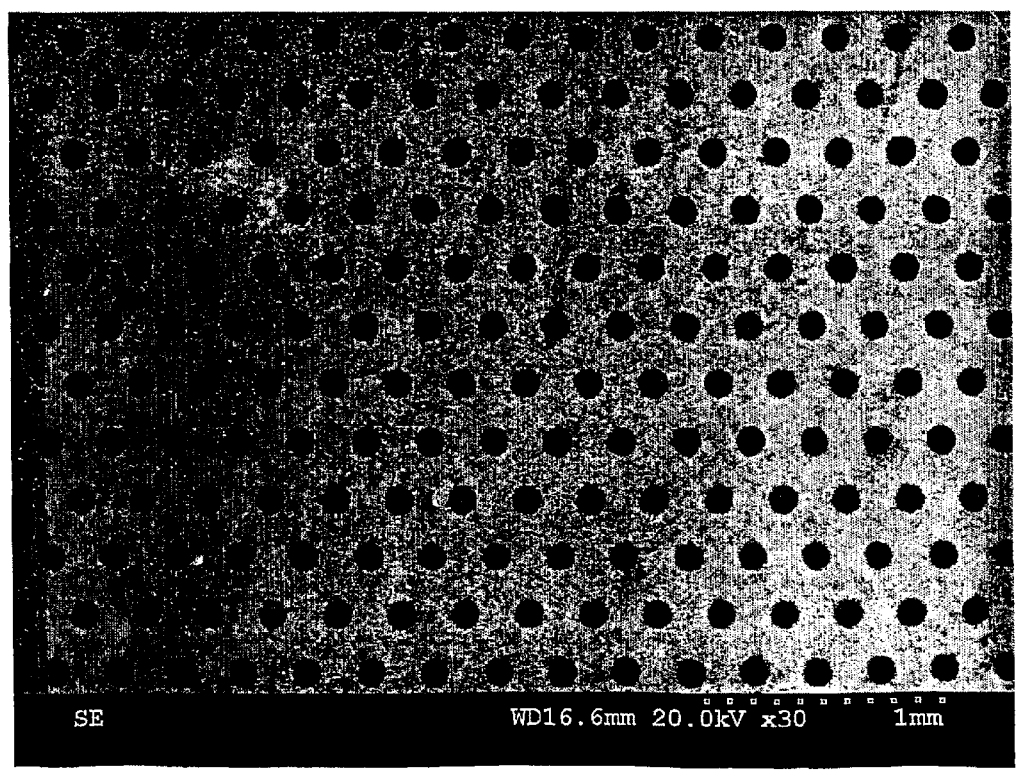
FIG. 6 is a SEM photograph of the ZSM-5 monolayer of zeolite patterned on a glass plate (magnification: ×30), which was prepared by the method in Example 10 (vacuum deposition of platinum).
Figure 7:
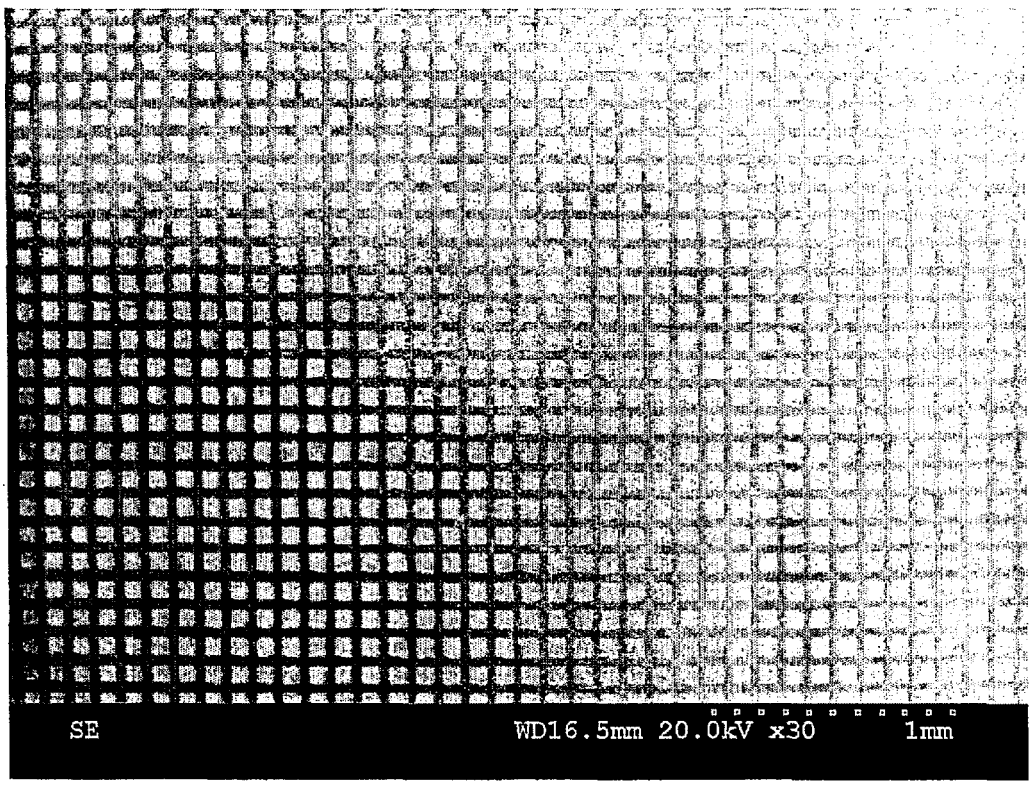
FIGS. 7, 8 and 9 are SEM (scanning electron microscope) photographs of a patterned zeolite ZSM-5 monolayer on a glass plate (magnification : ×30, ×180 and ×800, respectively), which were prepared by the method in Examples 7 (using a UV ray irradiation) and 11 (using a deposition of platinum).
Figure 8:
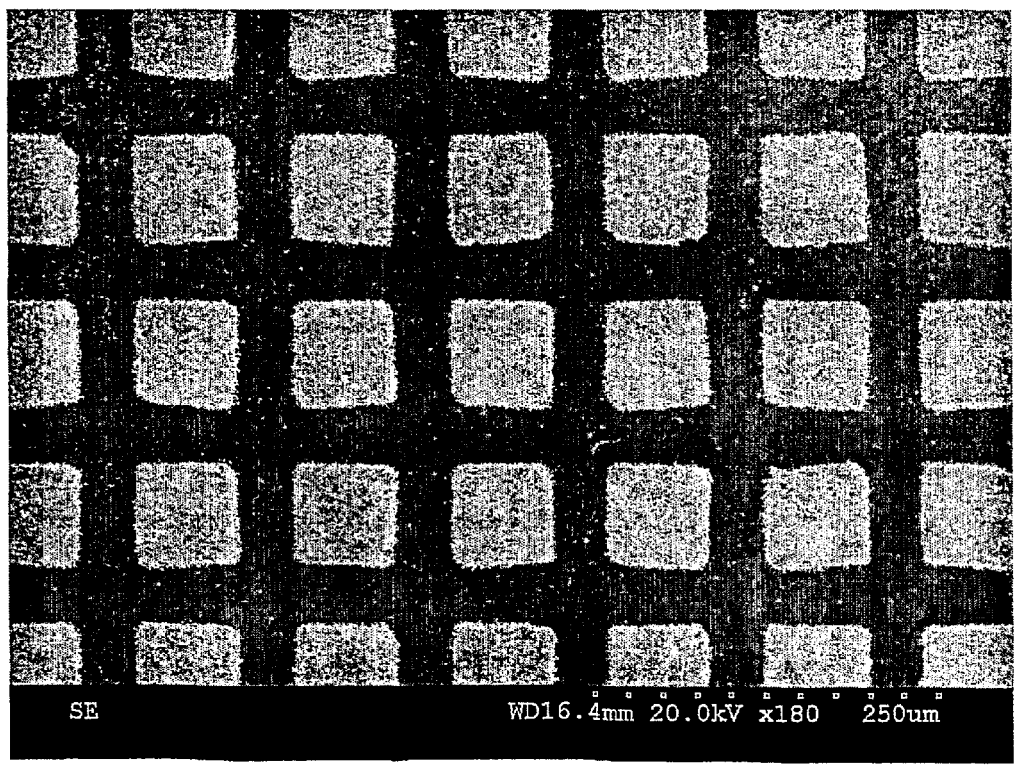
Figure 9:
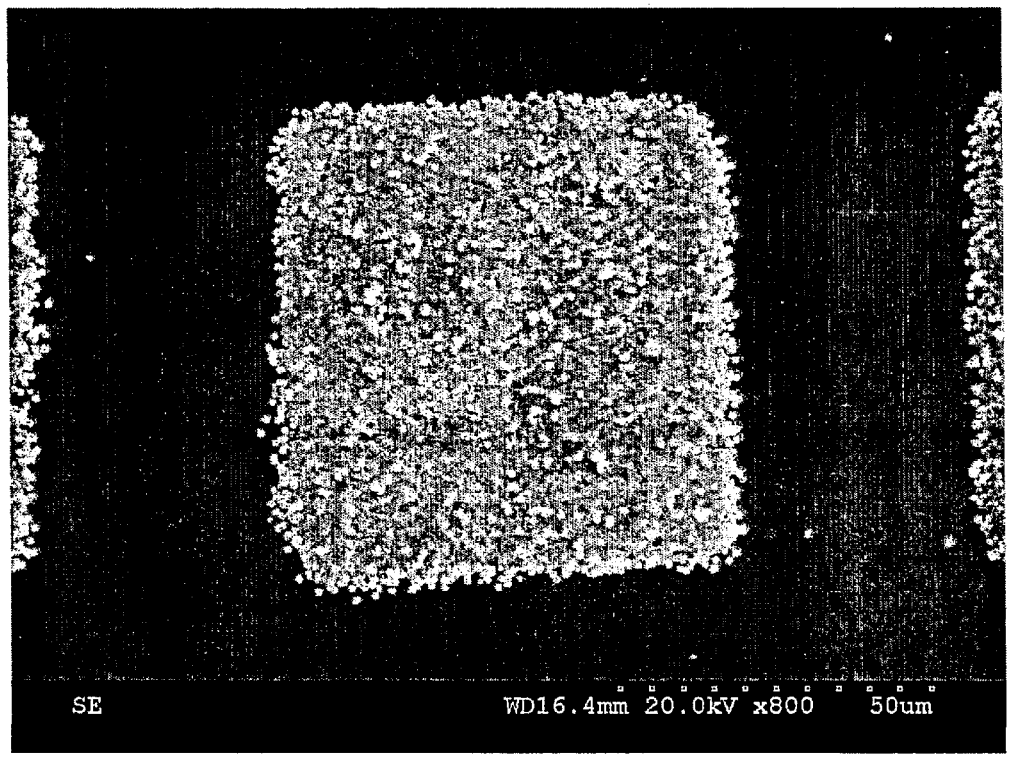
Figure 10:
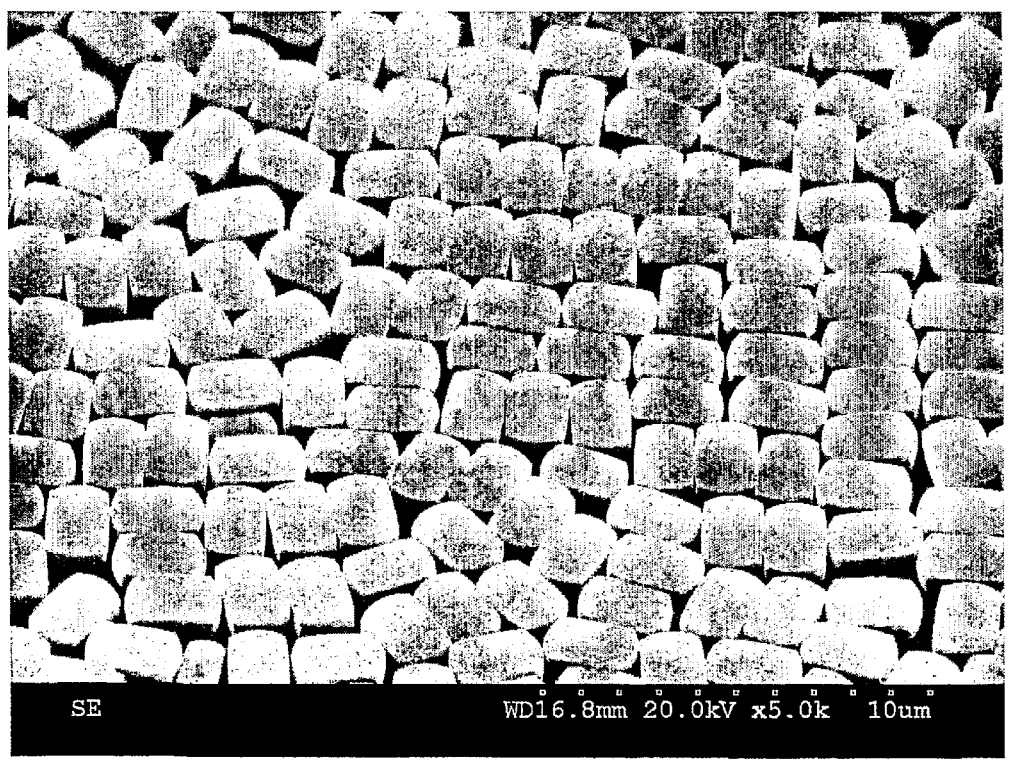
FIGS. 10 and 11 are SEM photographs of a patterned zeolite ZSM-5 and zeolite A monolayer on a glass plate (magnification: ×5000, respectively), in which the zeolite monolayer is largely expanded.
Figure 11:
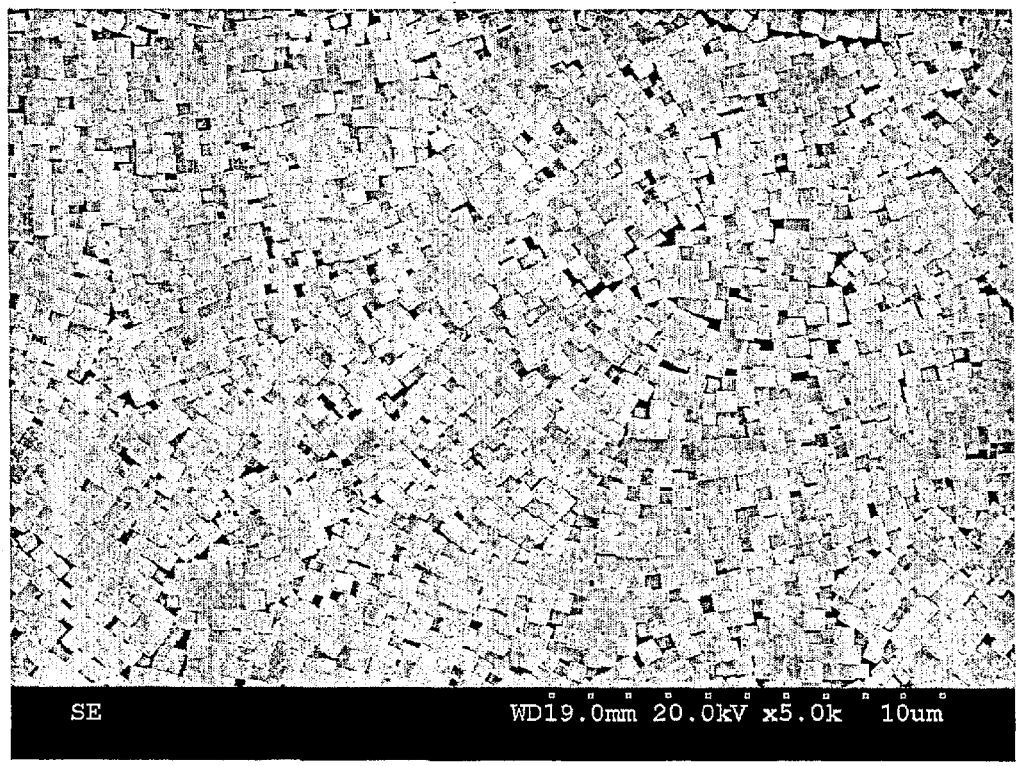
Figure 12:
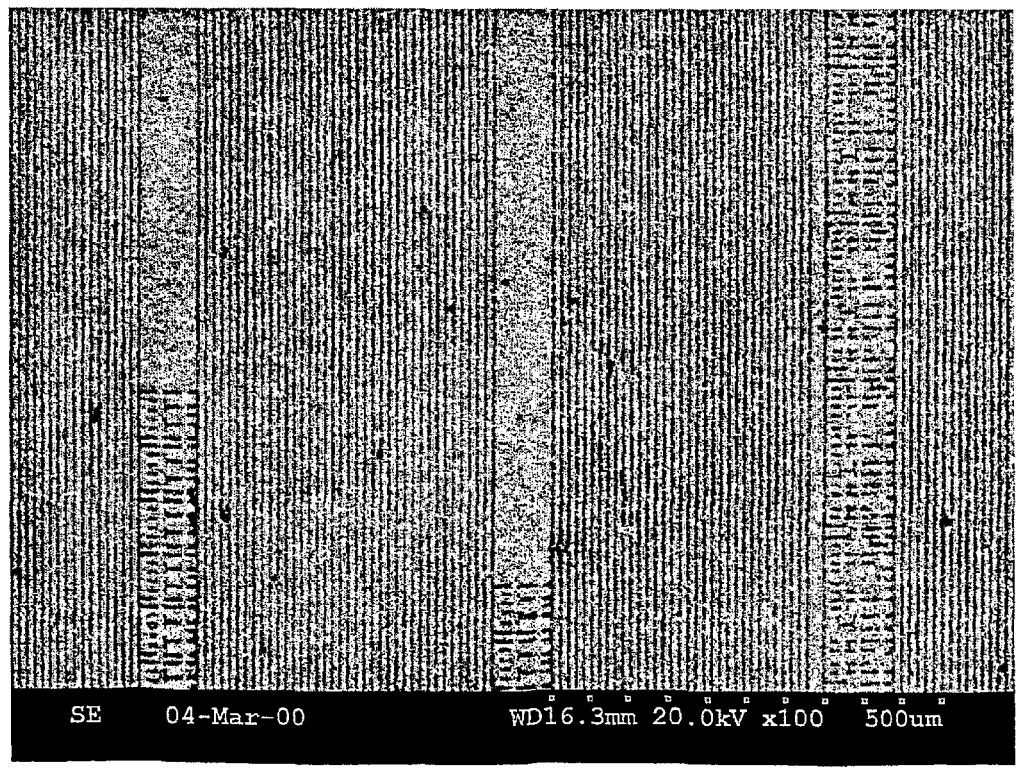
FIGS. 12, 13 and 14 are SEM photographs of a patterned zeolite ZSM-5 double-layer on a glass plate (magnification: ×100, ×40000, and ×60000, respectively), which were prepared by the method in Examples 13 (using a UV ray irradiation).
Figure 13:
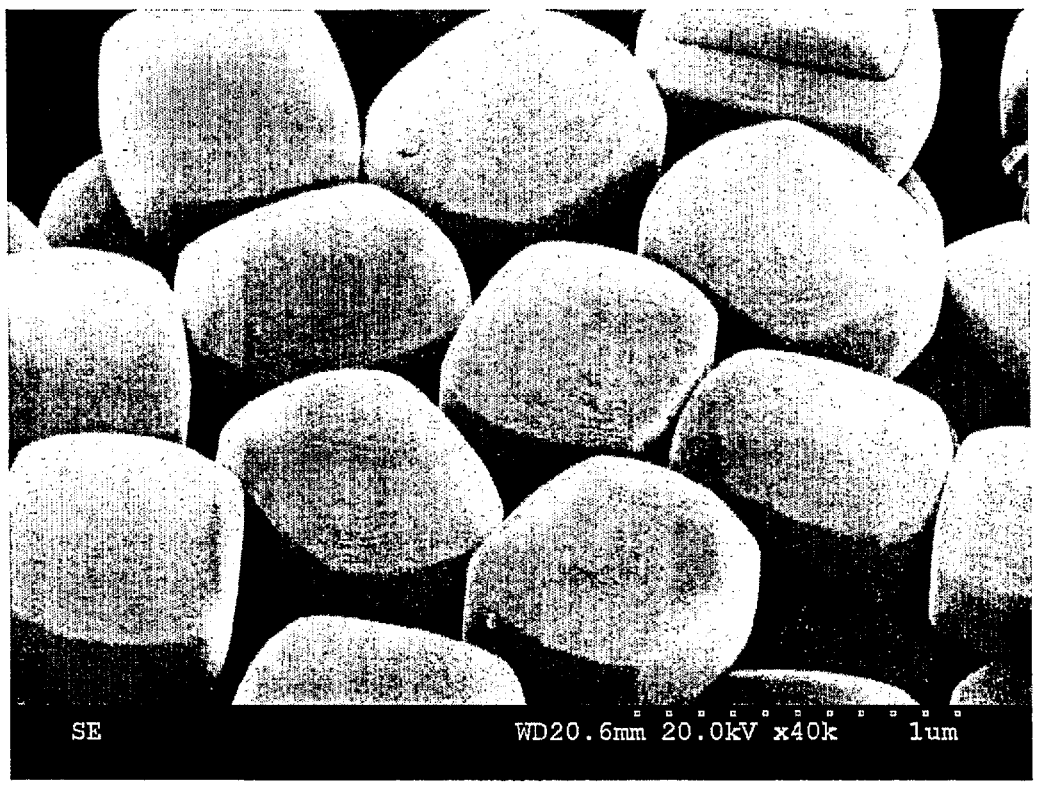

The present invention will now be described in detail by following specific but non-limiting embodiments. FIGS. 1 through 13 attached are referenced together in this connection.

EXAMPLES

Example 1

Pre-treatment of Substrate

A substrate such as glass, silicon wafers or the like was dipped in about 10% aqueous hydrochloric acid solution under heating for at least an hour or in a mixed solution of ammonium persulfate (($NH_4$)$_2S_2O_8$) and sulfuric acid for at least an hour. Then the substrate was washed with distilled water, which was again dipped in an aqueous ammonium solution for fifteen minutes and further in acetic acid for about thirty minutes. The resulting substrate was thoroughly washed with distilled water and stored in distilled water. The substrate was taken out and dried, when used.

Example 2

Preparation of Gold Substrate

On a substrate such as glass, silicon wafer or the like, titan or chrome was first deposited by vacuum evaporation to a thickness of 100 Å. On the layer of titan or chrome, gold was further deposited by vacuum evaporation to a thickness of 1000 Å. The resulting substrate was washed with piranha solution prepared by mixing sulfuric acid and hydrogen peroxide in a ratio of 7:3. The substrate was heated at 300° C. under vacuum for three hours and cooled, before using.

Example 3

Preparation of a Patterned Monolayer of Zeolite through a Chemical Ionic Bond on the Pattern Formed by UV Ray ($\lambda$=254 nm); Ionic Bond A glass plate was dipped in 50 ml of hexane containing (3-cyanopropyl)trichlorosilane ($Cl_3Si$—($CH_2$)$_3$—CN:0.05 ml) and left at room temperature for 24 hours. The glass plate combined with 3-cyanopropyl group was taken out and dipped in conc. HCl in a flask, which was heated at 95 to 100° C. for 2 hours. The cyano group was changed to carboxyl group through hydrolysis. The glass plate combined with carboxyl group [glass-($CH_2$)$_3$—$CO_2H$] was taken out and dipped in a saturated solution of sodium bicarbonate ($NaHCO_3$) for 12 hours. The hydrogen ion was substituted with a sodium ion through neutralization and the glass plate combined with the group of ($CH_2$)$_3$—$CO_2^-$.$Na^+$ could be obtained. The glass plate was dipped again in 1 M $AgNO_3$ solution for 12 hours. Then the sodium ion was changed to a silver ion through ion exchange and the glass plate combined with the group of ($CH_2$)$_3$—$CO_2^-$.$Ag^+$ was obtained.

On the glass plate combined with the group of ($CH_2$)$_3$—$CO_2^-$.$Ag^+$, a photomask on which a pattern was formed was put and irradiated with UV ray ($\lambda$=254 nm) for about 1 hour. The silver ion bound to the area exposed to UV ray was reduced to silver and the area not exposed to UV ray was left as it was. Accordingly the glass plate on which a pattern of —($CH_2$)$_3$—$CO_2^-$.$Ag^+$ group was formed was obtained.

The zeolite particles were introduced into a reaction vessel containing toluene and subsequently 3-aminopropylethoxysilane (APS) was added. The mixture was heated to react. After the completion of the reaction, the zeolite combined with 3-aminopropyl group was filtrated and washed thoroughly with toluene and ethanol. The zeolite combined with 3-aminopropyl group was added in 90% ethanol wherein sodium bicarbonate and iodomethane ($CH_3I$) were dissolved and agitated at 60° C. for 24 hours. The zeolite particles combined with the group of —($CH_2$)$_3$—$N(CH_3)_3^+$.$I^-$ were filtrated through a filter paper and then washed with ethanol and distilled water.

The zeolite particles combined with the group of —($CH_2$)$_3$—$N(CH_3)_3^+$.$I^-$ were introduced into a reaction vessel containing ethanol to be dispersed well, in which the glass plate combined with the group of ($CH_2$)$_3$—$CO_2^-$.$Ag^+$ patterned was dipped. The temperature was elevated to 60 to 78° C. and the glass plate was kept for 10 minutes and intermittently subjected to an ultrasonic vibration. The glass plate was taken out and dipped in toluene in a bottle. Subsequently the glass plate was subjected to an ultrasonic vibration to remove any zeolite particles which were loosely attached on the monolayer. Thus the patterned monolayer of zeolite could be prepared.

In said method for the preparation, the patterned monolayer of zeolite can be prepared also using a gold plate instead of the glass plate. When the gold plate is employed, however, the one terminal of the organic molecule combined to the gold plate should have a thiol group (—SH) instead of trichlorosilyl (—$SiCl_3$) or trialkoxysilyl (—$Si(OR)_3$; R=methyl or ethyl) group because the thiol group can combine only onto the metal surface sturdily.

Example 4

Preparation of a Patterned Monolayer of Zeolite through a Chemical Covalent Bond on the Pattern Formed by UV Ray (Mercury Light Source)

A glass plate was dipped in a reaction vessel containing toluene, to which (3-iodopropyl)trimethoxysilane was added. After being heated for 3 hours, the glass plate was washed well with toluene.

The glass plate combined with 3-iodopropyl group was undergone through the procedure of patterning by UV ray described in Example 3. Then there could be obtained a patterned glass plate wherein the iodo group in the area exposed to UV ray was decomposed and 3-iodopropyl group in the area not exposed was left as it was. Zeolite was introduced into a reaction vessel containing toluene to be dispersed well, wherein the glass plate combined with 3-iodopropyl group patterned was dipped. After being heated for 3 hours, the glass plate was taken out and dipped in toluene in a glass bottle. Subsequently the glass plate was subjected to an ultrasonic vibration to remove any zeolite particles which were loosely attached on the monolayer. Thus the patterned monolayer of zeolite could be prepared.

Example 5

Preparation of a Patterned Monolayer of Zeolite through a Chemical Covalent Bond on the Pattern Formed by UV Ray (Mercury Light Source)

A glass plate was dipped in a reaction vessel containing toluene, to which 1,4-diisocyanatobutane was added. The one of two isocyanate groups reacts with the glass plate to form the urethane bond and the other isocyanate group was left unreacted on the glass surface as it was.

The glass plate combined with isocyanate group was undergone through the procedure of patterning by UV ray described in Example 3. Then there could be obtained a patterned glass plate wherein the urethane group in the area exposed to UV ray was decomposed and isocyanate group bound to urethane in the area not exposed was left as it was. Zeolite was introduced into a reaction vessel containing toluene to be dispersed well, wherein the glass plate combined with isocyanate group patterned was dipped. After being heated for 3 hours, the glass plate was taken out and dipped in toluene in a glass bottle. Subsequently the glass plate was subjected to an ultrasonic vibration to remove any zeolite particles which were loosely attached on the monolayer. Thus the patterned monolayer of zeolite could be prepared.

Example 6

Preparation of a Patterned Monolayer of Zeolite through a Chemical Covalent Bond on the Pattern that was Formed by UV Ray (Mercury Light Source)

After a gold plate was dipped in 1 mM chloroform solution of 1-mercapto-11,13-pentacosadiyonoic acid (HS(CH$_2$)$_{10}$C≡C—C≡C(CH$_2$)$_{11}$—COOH) for 24 hours, it was taken out and washed with chloroform. Under nitrogen atmosphere, the glass plate was undergone through the procedure of patterning by UV ray described in Example 3. Then the polymerization was raised at the monolayer combined to the area exposed to UV ray to form network between the molecular chains. The self-assembled monolayer (SEM) in the portion not exposed to UV ray was removed and then a patterned gold plate on which the organic substance was selectively combined could be obtained.

The method for removing the portion not exposed to UV ray can be carried out generally through the method for isolating thiol from the gold surface. For instance, the method of reducing electrochemically, the method through the heat treatment and the method employing a corrosive solvent can be exemplified.

As such, the methods for isolating thiol from the gold surface have been well known in the pertinent art.

The zeolite combined to 3-aminopropyl group prepared in Example 3 was dispersed sufficiently in a suitable organic solvent (e.g., toluene or dichloromethane) wherein a coupling agent such as dicyclohexylcarbodiimide (DDC) and a base catalyst such as 4-dimethylaminopyridine (DMAP) were dissolved and subsequently the gold plate was dipped to be heated at 80° C. for 48 hours.

The gold plate was taken out and dipped in toluene in a glass bottle. Subsequently the glass plate was subjected to an ultrasonic vibration to remove any zeolite particles which were loosely attached on the monolayer. Thus the patterned monolayer of zeolite could be prepared. The coupling agent can be replaced with the other coupling agents that have been generally used in the pertinent art.

Further, as the zeolite can be combined with the substrate through the chemical reaction between the carboxyl group of substrate and the amino group of zeolite, the zeolite monolayer patterned on the gold plate can be prepared also by activating the carboxyl group of substrate so as to react easily with the amino group. For example, the patterned gold plate was dipped in dimethylformamide solution wherein trifluoroacetic anhydride (($CF_3CO$)$_2$O) and triethylamine were dissolved for twenty minutes. The terminal on the gold plate, i.e., carboxyl acid was changed to acetic acid trifluoroacetic anhydride (R—COOCOCF$_3$). Such a transform indicates an activated state of carboxyl acid and makes it react easily with amino group. The gold plate was taken out and washed with an organic acid and then dipped in toluene wherein zeolite combined with 3-aminopropyl group was dispersed. The reaction was carried out at room temperature for 48 hours. The gold plate was taken out and dipped in toluene in a glass bottle. Subsequently the glass plate was subjected to an ultrasonic vibration to remove any zeolite particles which were loosely attached on the monolayer. Thus the zeolite monolayer patterned on the gold plate could be prepared as described above.

Example 7

Preparation of a Patterned Monolayer of Zeolite through the Direct Growth of Zeolite Crystals on the Pattern that was Formed by UV Ray (Mercury Light Source)

According to the procedure described in Examples 3 and 4, the glass plate combined respectively with 3-aminopropylmethyl, propyl, 3-iodopropyl or 3-aminopropyl was prepared by using (3-aminopropyl) methyldiethoxysilane, propyltrimethoxysilane, (3-iodopropyl)trimethoxylsilane or (3-aminopropyl) triethoxysilane.

On the glass plate combined with an organic silane, a photomask scored with the pattern was put and irradiated with UV ray. The time of irradiation varies depending on the sort of organic silane and is preferably ranged from 10 minutes to 1 hour. The decomposition was raised in the area exposed to UV ray. Accordingly a glass plate wherein the organic silane layer was patterned could be obtained. The patterned glass plate was put in the zeolite synthetic gel and zeolite was grown directly on the glass plate. The direct growth of zeolite crystal was occurred in the area exposed to UV ray only. In this way, a patterned monolayer of zeolite could be obtained by the selective growth of crystal on the glass plate. To illustrate, observing the preparatory procedure for, growing gel of ZCM-5 zeolite, tetrapropyl ammonium hydroxide (TPAOH) as a zeolite template was dissolved in water and tetraethyl orthosilicate (TEOS) as a silicone source was added thereto and agitated till the uniform liquid was obtained. Subsequently sodium aluminate as an aluminum source was added and agitated again till the uniform liquid was obtained. The final composition of zeolite was shown as $SiO_2:Al_2O_3:TPAOH:Na_2O:H_2O=$ 0.1–1:0–0.035:0.1:0–0.017:20–150. The obtained synthetic gel and the patterned glass plate were put in an autoclave to be subject to the reaction at 120 to 180° C. for 3 to 12 hours.

The glass plate was taken out and dipped in toluene in a glass bottle. Subsequently the glass plate was subjected to an ultrasonic vibration to remove any zeolite particles which were loosely attached on the monolayer to be removed. Thus the patterned monolayer of zeolite could be prepared.

The variously patterned monolayer of zeolite can be obtained by changing the synthetic gel in the sort of zeolite. Producing the synthetic gel of zeolite has been widely known in the pertinent art.

Example 8

Preparation of a Patterned Monolayer of Zeolite through a Chemical Covalent Bond on the Pattern Formed by Chemicals The stamp on which a pattern was formed with polydimethylsiloxane (PDMS) was applied with the hexane solution of octadecyltrichlorosilane (OTS) and mounted on a spin coater. The PDMS stamp is rotated to uniformly distribute octadecyltrichlorosilane and then impressed on a glass plate. The glass plate is left at room temperature for more than one hour and is dried at 120° C. for five minutes. Octadecyltrichlorosilane reacts with silanol of glass to form an octadecyl monolayer in accordance with the shape of pattern. Namely the octadecyl monolayer is formed in the area wherein the stamp reached to the glass surface, while silanol on the glass surface is left as it is in the area wherein the stamp did not reach to the glass surface.

The obtained glass plate whereon octadecyl group was patterned was dipped in a reaction vessel containing toluene, wherein (3-chloropropyl)trimethoxysilane was added. After being heated for 3 hours, the glass plate was washed with toluene to give a glass plate whereon octadecyl and 3-chloropropyl groups were patterned. The glass plate whereon octadecyl and 3-chloropropyl groups were patterned was dipped in toluene wherein zeolite was dispersed and heated for 12 hours. The glass plate was taken out and dipped in toluene in a glass bottle. Subsequently the glass plate was subjected to an ultrasonic vibration to remove zeolite particles which are loosely attached on the monolayer.

Example 9

Preparation of a Patterned Monolayer of Zeolite through the Direct Growth of Zeolite Crystals on the Pattern that was Formed by Chemicals The glass plate on which the monolayer of octadecyl group was patterned was prepared by using the stamp whereon a pattern was formed with polydimethylsiloxane (PDMS) in accordance with the procedure described in Example 8.

As described in Example 7, the glass plate patterned with octadecyl group was put in a pressured reaction vessel containing gel for synthesis and zeolite was subjected to the direct growth of crystal on the glass plate. The zeolite crystal formed to grow only in the area whereto octadecyl group was not bound and a patterned monolayer of zeolite was produced.

Example 10

Preparation of a Patterned Monolayer of Zeolite through a Chemical Covalent Bond on the Pattern Formed by the Deposition of Platinum The mask on which a pattern is formed was put on the glass and a vacuum evaporation depositor deposited platinum to the thickness of 15 nm. Platinum was not deposited in the area with which the mask was contacted to prevent the treatment, but was deposited in the area exposed. In this way, the glass plate on which platinum and 3-chloropropyl group were patterned was obtained by treating the glass plate on which the pattern of platinum was formed in accordance with the procedure described in Example 8 and also the zeolite monolayer was produced thereon.

Example 11

Preparation of a Patterned Monolayer of Zeolite through the Direct Growth of Zeolite Crystal on a Pattern that was Formed by Deposition of Platinum A pattern of platinum was formed on a glass plate by the deposition of platinum in the same manner as in Example 10. The glass plate was put into the gel for the synthesis of zeolite and subjected to the crystal growth in the same manner as in Example 7. The crystal growth occurred only in the area on which a pattern of platinum was not formed.

Example 12

Preparation of a Patterned Bilayer of Zeolite through a Chemical Ionic Bond on a Pattern that was Formed by UV Ray (Mercury Light Source)

Firstly, A glass plate on which a patterned monolayer of zeolite was formed was prepared in the same manner as in Example 3.

Separately, zeolite combined with the group of $(CH_2)_3$—$CO_2^-.Na^+$ was prepared and dispersed in toluene. The glass plate on which a patterned zeolite monolayer was formed was dipped in said solution., The temperature was elevated to 60~78° C. and kept for 10 minutes, during which the glass plate was vibrated by an ultrasonic washer intermittently. The glass plate was taken out and dipped in toluene in a bottle. Subsequently the glass plate was subjected to an ultrasonic vibration to remove any unreacted zeolite particles which were loosely attached on the zeolite bilayer. Thus a patterned zeolite bilayer of could be prepared.

Example 13

Preparation of a Patterned Bilayer of Zeolite through a Chemical Covalent Bond on the Pattern that was Formed by UV Ray (Mercury Light Source)

Firstly, a glass plate on which a patterned monolayer of zeolite was formed was prepared in the same manner as in Example 4.

Separately zeolite combined with 3-iodopropyl group was then prepared and dispersed in toluene, in which the glass plate on which a patterned monolayer of zeolite had been formed was dipped. The glass plate was heated for 3 hours and taken out and dipped in toluene in a bottle. Subsequently the glass plate was subjected to an ultrasonic vibration to remove any unreacted zeolite particles which were loosely attached on the zeolite bilayer. Thus a patterned zeolite bilayer of could be prepared.

Example 14

Preparation of a Patterned Bilayer of Zeolite through a Chemical Covalent Bond on the Pattern that was Formed by the Deposition of Platinum Firstly, a glass plate on which a patterned zeolite monolayer was formed was prepared in the same manner as in Example 9.

Separately zeolite combined with 3-iodopropyl group was prepared and dispersed in toluene, wherein the glass plate whereon a patterned monolayer of zeolite was formed was dipped. The glass plate was heated for 3 hours and taken out and dipped in toluene in a bottle. Subsequently the glass plate was subjected to an ultrasonic vibration to remove any unreacted zeolite particles which were loosely attached on the zeolite bilayer. Thus a patterned zeolite bilayer of could be prepared.

Example 15

Preparation of a Patterned Multilayer of Zeolite

First, a glass plate on which a patterned bilayer of zeolite was formed was prepared in the same manner as in Example 12.

Then, zeolite combined with the group of $(CH_2)_3$—$N(CH_3)_3^+.I^-$ was dispersed in ethanol in a reaction vessel and dispersed thoroughly, during which the glass plate was intermittently vibrated by an ultrasonic washer. The glass plate was taken out and dipped in toluene in a bottle. Subsequently the glass plate was subjected to an ultrasonic vibration to remove any unreacted zeolite particles which were loosely attached on the zeolite bilayer. Thus a patterned zeolite tri-layer of could be prepared.

By repeating the procedure, the number of layers in the multilayer can be controlled in accordance with the number of repeating times. Further repeating the procedure in the same manner as in Examples 13 and 14 could produce the zeolite multilayer.

Example 16

Preparation of a Patterned Monolayer of Zeolite Composite on the Pattern that was Formed by UV Ray (Mercury Light Source)

In this Example, a glass plate on which a patterned monolayer of zeolite is formed was prepared in the same manner as in Example 7.

The glass plate was calcined and the organic substance existed in the area wherein zeolite did not grow (or combine) was removed. The glass plate was again put into the gel for the synthesis of zeolite and subjected to the second crystal growth on the surface of glass. Primarily when a pattern of zeolite is obtained by the crystal growth of ZSM-5 zeolite, secondarily a pattern of zeolite composite is obtained by the crystal growth of zeolite-A. The crystal growth can be progressed differently because of the difference of the growing speed between the surfaces of glass and zeolite.

The combination of zeolite style other then said one could be employed also.

Example 16

Analysis of Scanning Electron Microscope (SEM)

Figure 14:
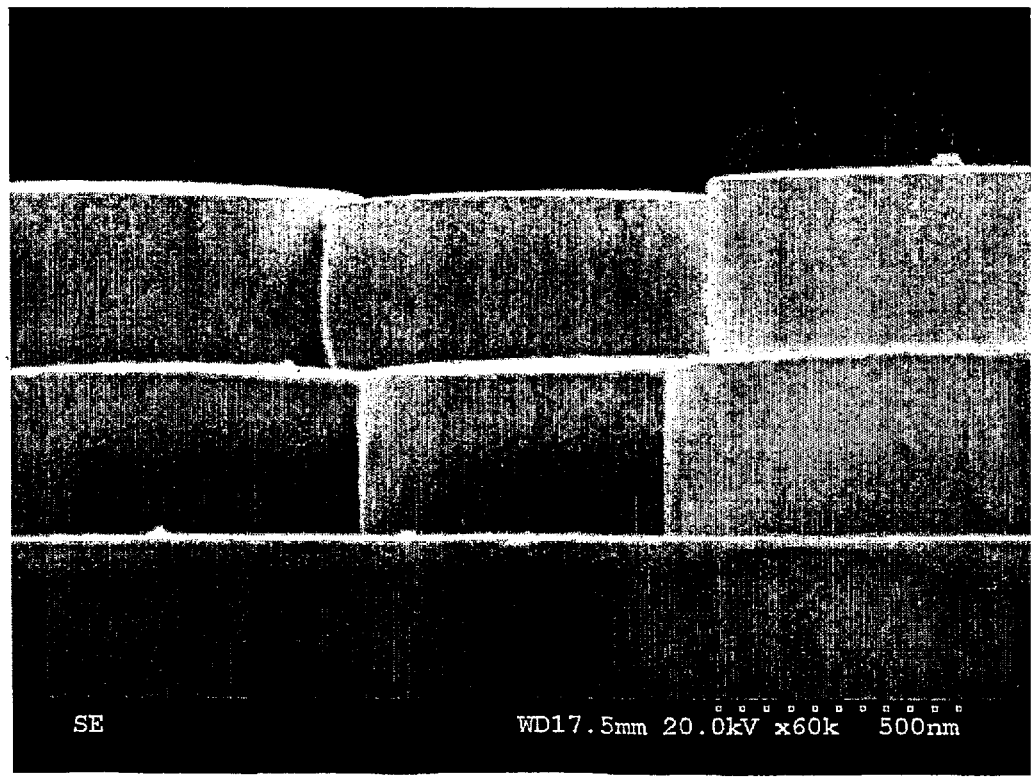
Figure 15:
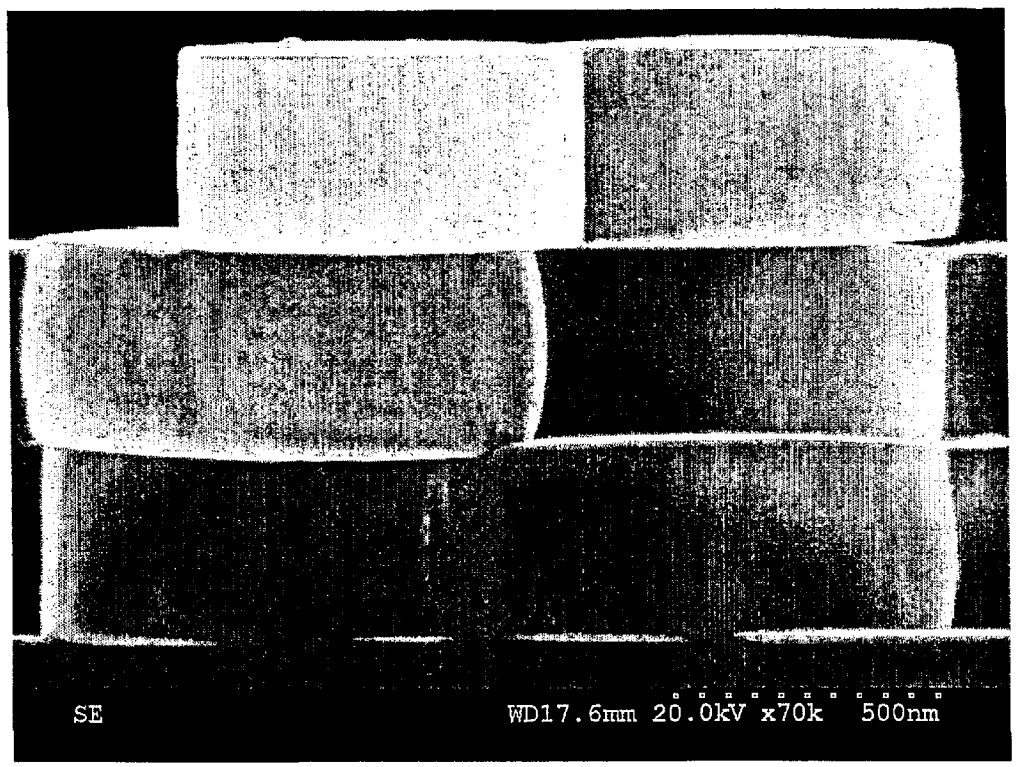
FIGS. 15 and 16 are SEM photographs of a patterned zeolite ZSM-5 multilayer on a glass plate (magnification: ×70000, respectively), which show the sectional view of the multilayer.
Figure 16:
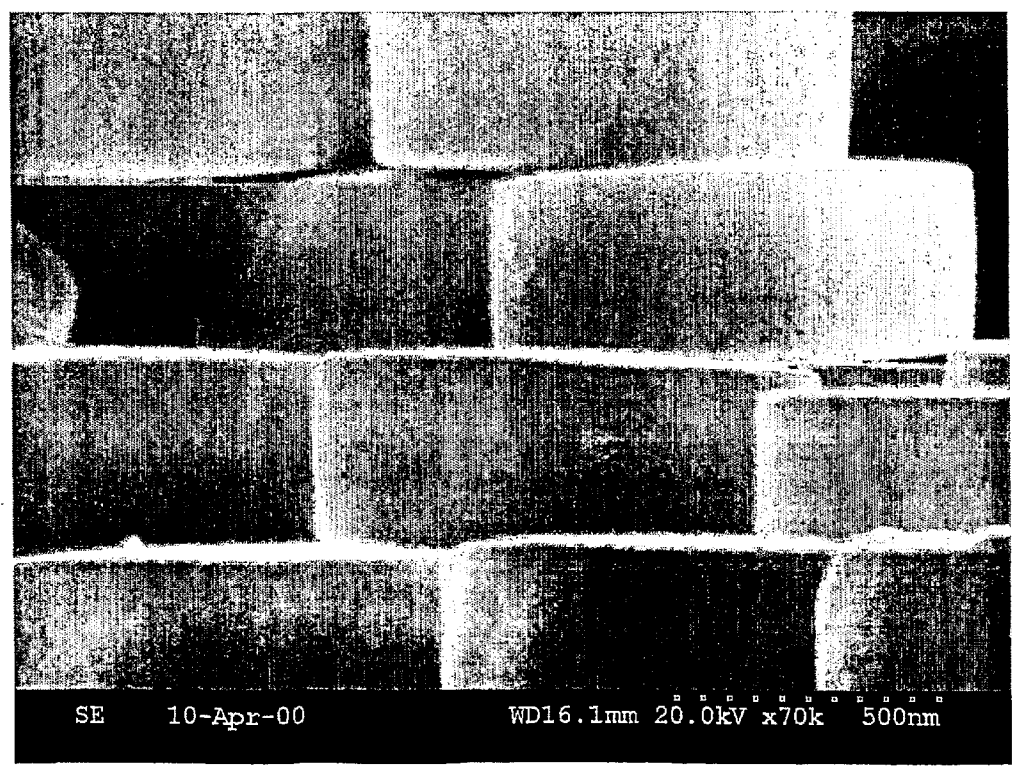

On a monolayer or multilayer of zeolite prepared in the same manner as in said examples, the coating of platinum/palladium was executed in a thickness of about 15 nm and an image of SEM was obtained by a scanning electron microscope (model; Hitachi S-4300). FIGS. 1 to 16 show the representative images of the SEM images of the various composites prepared by the method of each example.

Industrial Applicability

According to the present invention, a composite having a patterned zeolite monolayer or multilayer via a chemical bond can be prepared. In addition, the terminal functional group of the linking compound can be very diversely modified, and thus the bonding methods also can be very diversely modified. In addition, since it is possible to control and modify the type and kind of zeolite as well as the pattern style of each layer in a multiple layer, the present invention is very advantageous in view of practical use.

The composite having a patterned monolayer or multi-layer of molecular sieve prepared according to the present invention can be usefully employed for a separating membrane for gas or liquid, a linear or nonlinear optical device, the optoelectronics, a membrane, a membrane catalyst, a sensor carrier, a photocell, or in the field of film formation using the second growth of zeolite. In addition, it is expected that there may be caused new physical property when zeolite particles form a pattern. Accordingly, such a new composite is expected as an epoch-making material at the aspect of science as well as utility.

What is claimed is:

1. A method for the preparation of a zeolite-substrate composite comprising a patterned zeolite monolayer or multilayer, characterized in that it comprises (i) combining a linking compound onto the surface of substrate, (ii) modifying the linking compound combined to the substrate or the functional group thereof by irradiating UV ray through a photomask having a pattern, (iii) selectively forming a zeolite layer on the area to which UV ray is or is not irradiated, and (iv) optionally performing a calcination.

2. A method for the preparation of a zeolite-substrate composite comprising a patterned zeolite monolayer or multilayer, characterized in that it comprises (i) combining a linking compound to a part of the surface of the substrate so as to have a predetermined pattern and then combining a blocking compound to the remaining surface of the substrate, or combining a blocking compound to a part of the surface of the substrate so as to have a predetermined pattern and then combining a linking compound to the remaining surface of the substrate, (ii) forming a zeolite layer on the area to which the linking compound is combined, and (iii) optionally performing a calcination.

3. A method for the preparation of a zeolite-substrate composite comprising a patterned zeolite monolayer or multilayer, characterized in that it comprises (i) depositing a metal such as platinum onto a part of the substrate surface to form a metal layer so as to have a predetermined pattern. (ii) forming a zeolite layer by growing crystal or combining zeolite-linking compound on the remaining area, and (iii) optionally performing a calcination.

4. The method as claimed in claim 1, characterized in that said zeolite layer is formed after removing the portion to which UV ray is irradiated or the portion to which UV ray is not irradiated.

5. The method as claimed in claim 2, characterized in that said linking compound having functional group at both terminals or a blocking compound which does not have any functional group at the one terminal such as octadecyl-trichlorosilane was applied and then bonded on a part of the substrate surface by the stamp method.

6. The method as claimed in any one of claims 1 to 5, characterized in that the patterned or non-patterned layer of zeolite was previously formed on all or a part of the substrate surface.

7. The method as claimed in any one of claims 1 to 5, characterized in that said substrate is selected from the group consisting of:

1) all substances containing hydroxyl groups on the surface, 2) metals capable of reacting with a thiol or amino group,
3) polymers having various functional groups on their surfaces,
4) semiconductive materials, and
5) natural or synthetic zeolite or molecular sieve analogs.

8. The method as claimed in any one of claims 1 to 5, characterized in that the linking compounds which form the substrate-linking compound and the zeolite (or its analog)-linking compound are identical or different from each other and selected from the compounds of the following formula 1 to 7 or a combination thereof.

| | |
|---|---|
| $R_3Si-L-X$ | (1) |
| $MR'_4$ | (2) |
| $Y-L-Y$ | (3) |
| $R_3Si-L-Y$ | (4) |
| $HS-L-X$ | (5) |
| $HS-L-SiR_3$ | (6) |
| $HS-L-Y$ | (7) |

Wherein, R represents a halogen atoms $C_1$–$C_4$ alkoxy or alkyl group; L represents a hydrocarbon residue, which may have at least one heteroatom such as oxygen, nitrogen and sulfur; X represents a leaving group such as a halogen atom: provided that at least one of the three Rs in a $SiR_3$ group denote a halogen or alkoxy group; R' is the same as R and the two of four R's in $MR'_4$ denote a halogen or alkoxy group; M represents Si or a transition metal such as Ti or Zr; Y represents a ligand having a functional group selected from a group consisting of hydroxyl, thiol, amine, ammonium, sulfone and its salt, carboxyl acid and its salt, acid anhydride, epoxy, aldehyde, ester, acrylato, isocyanate (—NCO), sugar residue, double bond, triple bond, diene, diyne, alkylphosphine, alkylemine as well as a reactive functional group of various coordination compounds capable of exchanging their ligands; provided that said functional group can exist in the middle or at the terminal ends of the ligands.

9. The method as claimed in any one of claims 1 to 5, characterized in that zeolite is selected from the group consisting at
1) Natural and synthetic zeolite,
2) Modified molecular sieve wherein all or a part of the silicon atoms in the zeolite skeleton are replaced with other atoms such as phosphorous (P) or the like
3) Modified molecular sieve in which all or a part of the aluminum atoms in the zeolite skeleton are replaced with other atoms,
4) Molecular sieves by the combination of the above modifications of the above modifications of item 2 and 3,
5) Porous metals or silicon oxides or mixed oxide thereof, and
6) Porous molecular sieves prepared with any other elements alone or in a mixture.

10. The method as claimed in claim 9, characterized in that said linking compound can be intermediated by at least a compound selected from a group consisting of fullerene ($C_{60}$, $C_{70}$), carbon nanotubes, α,ω-dialdehyde, dicarboxylic acid, dicarboxyl acid anhydride, amine-dendrimer, polyethylene imine, α,ω-diamine, a complex of [M(salan)], and metal porphyrin derivatives.

11. The method as claimed in any one of claims 1 to 5, characterized in that said zeolite layer is formed or originated from zeolite (or analogous molecular sieve), zeolite (or analogous molecular sieve)-linking compound or crystal grown zeolite.

12. The method as claimed in any one of claims 1 to 5, characterized in that, on a patterned zeolite layer, an upper layer consisting of the same or different kind of zeolite is formed so as to have a pattern.

13. The method as claimed in claim 12, characterized in that the upper layer is formed so as to have a pattern the same or different from that of the lower layer.

14. The method of claim 8 wherein said hydrocarbon residue is selected from the group consisting of a substituted $C_1$–$C_{17}$ alkyl, an unsubstituted $C_1$–$C_{17}$ alkyl, a substituted $C_1$–$C_{17}$ aralkyl, an unsubstituted $C_1$–$C_{17}$ aralkyl, a substituted $C_1$–$C_{14}$ aryl, and an unsubstituted $C_1$–$C_{17}$ aryl.

15. A method according to claim 9 wherein said modified molecular sieve is selected from the group consisting of a $AlPO_4$ type molecular sieve, a SAPO type molecular sieve, a MeAPO type molecular sieve, and a MeAPSO type molecular sieve.

16. A method according to claim 9 wherein said porous metals or silicon oxides are selected from the group consisting of a silicailte, a MCM type porous silica, a porous titanium dioxide and niobium dioxide.

17. A method according to claim 10 wherein M is selected from the group consisting of Co, Ni, Cr, Mn, and Fe.

18. A method according to claim 10 wherein elan represents N,N-bis(salicylidene)ethyleflediamifle).

* * * * *